United States Patent [19]  [11]  4,324,666
Hunt  [45]  Apr. 13, 1982

[54] METHOD OF REMOVING FERROCYANIDE IONS FROM RINSE WATER OF AN ALKALINE CYANIDE METAL PLATING PROCESS

[75] Inventor: John E. Hunt, Barrington, Ill.

[73] Assignee: DuTone Corporation, Waukegan, Ill.

[21] Appl. No.: 171,599

[22] Filed: Jul. 23, 1980

[51] Int. Cl.$^3$ .............................................. C02F 1/52
[52] U.S. Cl. ................................... 210/722; 210/724; 210/739; 210/754; 423/367
[58] Field of Search ................. 204/50 Y, 52 Y, 55 Y, 204/DIG. 13; 210/702, 712, 717, 722, 723–728, 904, 912, 709, 739, 754–756; 423/143, 367

[56] References Cited

U.S. PATENT DOCUMENTS

| | | | |
|---|---|---|---|
| 3,427,256 | 2/1969 | Milgrom | 423/367 |
| 3,843,516 | 10/1974 | Yamada et al. | 210/904 |
| 4,038,160 | 7/1977 | Crowther et al. | 210/702 |
| 4,043,907 | 8/1977 | Shimamura et al. | 210/667 |

FOREIGN PATENT DOCUMENTS

| | | | |
|---|---|---|---|
| 47-10959 | 4/1972 | Japan | 210/904 |
| 49-120463 | 11/1974 | Japan | 204/DIG. 13 |
| 49-134163 | 12/1974 | Japan | 210/904 |

*Primary Examiner*—Peter A. Hruskoci
*Attorney, Agent, or Firm*—Krass, Young & Schivley

[57] ABSTRACT

A method of removing ferrocyanide ions from the rinse water of an alkaline cyanide metal plating process which comprises adding a sufficient amount of manganous ions to the rinse water containing ferrocyanide ions to form a water insoluble precipitate of manganous ferrocyanide [$Mn_2Fe(CN)_6$] which can be readily separated from the rinse water.

6 Claims, No Drawings

METHOD OF REMOVING FERROCYANIDE IONS FROM RINSE WATER OF AN ALKALINE CYANIDE METAL PLATING PROCESS

DESCRIPTION

INTRODUCTION

This invention relates to plating processes and particularly to a method for removing ferrocyanide ions from plated parts rinse water.

BACKGROUND ART

The conventional alkaline cyanide metal plating process includes the steps of plating metal articles in an alkaline cyanide plating bath, (for example, a cyanide zinc or cyanide cadmium alkaline plating bath), removing and rinsing each article in water, and chlorinating the rinse water to remove cyanide and other contaminants. For a description of the conventional chlorination step, see the commercial bulletin entitled "The Chemical Destruction of Common Plating Room Waste", The Harshaw Chemical Company, 1972. During the plating of metal articles in alkaline cyanide plating systems, ferrocyanide ions built up with other cyanide ions. The ferrocyanide ions, unlike most other metal cyanide ions are not destroyed when rinse water is treated by conventional chlorination methods. Prior to the present invention, no economical, effective process has been known for removing the ferrocyanide ions from rinse water of an alkaline cyanide metal plating bath. It would be highly desirable to have an economical, effective process for removal of ferrocyanide ions from rinse water, since these ions when exposed to sunlight are decomposed into cyanide ions which are harmful to plant and animal life.

SUMMARY AND DETAILED DESCRIPTION

I have invented an effective method for removing ferrocyanide ions from rinse water of an alkaline cyanide metal plating process. The method comprises incorporating a sufficient amount of manganous ions with the rinse water containing ferrocyanide ions to form a water insoluble precipitate of manganous ferrocyanide [$Mn_2Fe(CN)_6$] and removing the precipitate from the treated rinse water. The reaction is represented by the following equation:

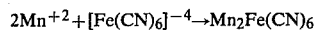

$$2Mn^{+2} + [Fe(CN)_6]^{-4} \rightarrow Mn_2Fe(CN)_6$$

It has been found that ferrocyanide ions are typically present in the rinse water, just before disposal, in concentrations up to about 2 ounces per gallon. When treating rinse water containing ferrocyanide ions according to the invention, the pH is adjusted, if necessary, and an aqueous solution of manganous ions in the form of a water soluble manganous salt, such as manganous chloride or other water soluble manganous salt which does not oxidize ferrous ion to ferric ion, is incorporated or mixed with the rinse water. The amount of manganous salt is at least chemically equivalent to the amount, and preferably in excess of the amount, required to react with the ferrocyanide ions present. The excess is not critical but for reasons of economy is preferably about 5% by weight in excess of the equivalent amount. The manganous ferrocyanide compound is immediately formed as an insoluble precipitate. It can be removed from the water by settling and decantation or by filtration, in any suitable way. For best results in handling the precipitate, one uses a continuous system which may be of conventional design including a settling tank having a settling compartment sized to have a retention time of 15 to 30 minutes, in series with a continuous counter-flow rinse tank. The rinse tank has first and second rinse compartments into which, following plating, the plated objects from the plating bath can be successively dipped and removed. The system is arranged so that the continuous overflow from the first rinse can be fed to the intake side of the settling tank. The feed arrangement includes means monitoring both the pH and the ferrocyanide concentration of the overflow rinse water, as well as means for pH adjustment, addition of manganous ion as required, and mixing. The settling tank is such that treated rinse water fed via the intake passes through and emerges from the tank as effluent completely free of $Mn_2Fe(CN)_6$ precipitate. Under steady state operation, the rate of rinse overflow, pH adjustment, and addition of manganous ion will be substantially constant so that only occasional monitoring is required. The precipitate also can be removed from the water as a solid phase by filtering the treated rinse water in conventional manner. Thereafter, the ferrocyanide-free rinse water, whether as effluent from the settling tank or as the filtrate, is subjected to chlorination to remove excess cyanide, metal cyanide compounds and any excess manganous ions.

The rinse water is preferably treated to remove the ferrocyanide ions prior to the usual chlorination treatment of the rinse water. This is done because the chlorination treatment oxidizes ferrocyanide ions to ferricyanide ions which latter ions are more toxic than ferrocyanide ions and because manganous ferricyanide is not as insoluble as manganous ferrocyanide. Also, by chlorinating the rinse water after the treatment thereof with manganous ions, any excess manganous ions are advantageously removed from the rinse water in the form of insoluble manganese dioxide without requiring an additional treating step.

According to the invention, the rinse water is preferably maintained at a pH above pH 7 although the reaction between manganous ions and ferrocyanide ions can take place on the acid side. Under these acid conditions, however, toxic cyanide gas begins to form so that precautions must be taken to collect the gas. Under highly acidic or basic conditions, the manganous ions are oxidized to form insoluble manganese dioxide ($MnO_2$) and are thus removed from the solution before reacting with the ferrocyanide ions. Accordingly, the pH of the rinse water is preferably maintained at a value ranging from pH 7 to pH 10, the optimum value being pH 8.

As a specific example of the method of the present invention, rinse water, free of solids and typically assaying per liter about 1.5 gm. zinc, 7.5 gm. sodium hydroxide, 4.0 gm. sodium carbonate, 3.75 gm. sodium cyanide, and 1.5 gm. ferrous iron as sodium ferrocyanide [$Na_4Fe(CN)_6$], is adjusted to pH 8, if necessary, by addition of dilute (5%) aqueous hydrochloric acid. Ferrous ion in sodium ferrocyanide hydrated with 10 moles of water is approximately 11.54% or in this case 173 mg. Manganous ion (357 mg., 5% in excess of the amount required to react with the sodium ferrocyanide present) in the form of an aqueous solution of 1.286 gm. of manganous chloride tetrahydrate ($MnCl_2 \cdot 4\,H_2O$), is added with mixing to each liter of rinse water at room temperature. The rinse water containing added manganous ion is well mixed and then allowed to settle for 30 minutes. A clear supernatant liquid is formed, and a greenish precipitate of manganous ferrocyanide settles out. The liquid is sampled and the sample analyzed spectrophotometrically for the presence of iron and manganous ions. In the typical case, no iron is detected, thereby indicating substantially complete removal of the ferrocyanide ions. Manganous ion corresponding in amount to the excess manganous ion added to the pretreated rinse water can be detected in the supernatant. As an alternative to removal of the precipitate by settling out, one can remove the precipitate by filtration. In this case, the rinse water is treated as indicated, and the treated water is filtered through a standard filter paper and the filtrate analyzed for the presence of iron and manganous ions. No iron is detected, indicating substantially complete removal of the ferrocyanide ion. The filtrate is found to contain an amount of manganous ion corresponding to the 5% excess added. The assay for metal can be conveniently carried out using an atomic absorption spectrophometer, Model No. 306, Perkin-Elmer Co., Norwalk, Conn., capable of detecting as little as 0.1 mg. iron, zinc, or manganous ion per liter.

Rinse water treated according to the invention and subjected to the conventional chlorination treatment to remove cyanide ions, typically analyzes negative for iron and managanous ions, that is below the 0.1 mg. per liter minimal lever which the spectrophotometer is capable of detecting.

While the invention has been described in detail in the foregoing specification, it will be realized by those skilled in the art that considerable variation can be made in such detail without departing from the spirit and scope of the invention as hereinafter claimed.

1. In an alkaline cyanide metal plating process including plating metal articles, rinsing the improvement comprising the plated articles in water, and subjecting the rinse water to chlorination, the steps of removing ferrocyanide ions present in the rinse water prior to chloriniation by mixing with the rinse water maintained at pH values ranging from pH 7 to pH 10 at least one equivalent of soluble manganous salt required to react with the ferrocyanide ions present, thereby forming manganous ferrocyanide $[Mn_2Fe(CN)_6]$ as a water insoluble precipitate and removing the precipitate from the treated rinse water.

2. A process according to claim 1 where the amount of manganous salt is in excess of that required to react with the ferrocyanide ions present in the rinse water.

3. A process according to claim 1 where the manganous salt is manganous chloride.

4. A process according to claim 2 where the rinse water after chlorination and prior to disposal is analyzed for iron and manganese ion by spectrophotometric means such that rinse water containing less then 0.1 part per million by weight of iron and manganese is selected for disposal.

5. A process according to claim 1 where the rinse water is adjusted to pH 8.

6. A process according to claim 1 where the amount of manganous salt is about 5% in excess of that required to react with the ferrocyanide ions present in the rinse water.

* * * * *